US005751532A

United States Patent [19]

Kanuchok et al.

[11] Patent Number: 5,751,532
[45] Date of Patent: May 12, 1998

[54] INTERGRATING RESET OVERCURRENT RELAY

[75] Inventors: John M. Kanuchok, Collinsville; Jeffrey A. Burnworth, Swansea; James A. Bright, Glen Carbon, all of Ill.

[73] Assignee: Basler Electric Company, Highland, Ill.

[21] Appl. No.: 608,306

[22] Filed: Feb. 28, 1996

[51] Int. Cl.[6] ............................................. H02H 3/00
[52] U.S. Cl. ............................ 361/94; 361/87; 361/115
[58] Field of Search .......................... 361/23, 24, 94–97, 361/93, 92, 115, 18, 100, 87; 364/481, 483, 492

[56] References Cited

U.S. PATENT DOCUMENTS

| | | | |
|---|---|---|---|
| 3,735,201 | 5/1973 | May ............................................. | 317/11 |
| 4,240,149 | 12/1980 | Fletcher et al. ........................... | 364/483 |
| 4,272,816 | 6/1981 | Matsumoto ................................ | 364/483 |
| 4,321,681 | 3/1982 | Sackin et al. .............................. | 364/492 |
| 4,331,997 | 5/1982 | Engel et al. ............................... | 361/93 |
| 4,362,986 | 12/1982 | Burke et al. ............................... | 324/51 |
| 4,528,611 | 7/1985 | Udren ......................................... | 361/81 |
| 4,530,024 | 7/1985 | Brady, Jr. .................................. | 361/63 |
| 4,550,360 | 10/1985 | Dougherty ................................. | 361/93 |
| 4,556,882 | 12/1985 | Brifman et al. ...................... | 340/825.06 |
| 4,587,590 | 5/1986 | Bala et al. .................................. | 361/94 |
| 4,620,156 | 10/1986 | Alvin et al. ................................ | 324/424 |
| 4,626,772 | 12/1986 | Michel ........................................ | 324/52 |
| 4,631,625 | 12/1986 | Alexander et al. ........................ | 361/94 |
| 4,670,812 | 6/1987 | Doerfler et al. ........................... | 361/83 |
| 4,685,024 | 8/1987 | Martellock et al. ....................... | 361/93 |
| 4,722,059 | 1/1988 | Engel et al. ............................... | 364/483 |
| 4,751,605 | 6/1988 | Mertz et al. ................................ | 361/91 |
| 4,755,903 | 7/1988 | Kotani ........................................ | 361/80 |
| 4,937,769 | 6/1990 | Verbanets .................................. | 364/574 |
| 4,996,624 | 2/1991 | Schweitzer, III .......................... | 361/63 |
| 4,998,098 | 3/1991 | Schweitzer, III .......................... | 340/662 |
| 5,041,737 | 8/1991 | Schweitzer, III et al. ................ | 307/125 |
| 5,140,492 | 8/1992 | Schweitzer, III .......................... | 361/80 |
| 5,157,575 | 10/1992 | Feltis et al. ................................ | 361/63 |
| 5,208,545 | 5/1993 | Schweitzer, III .......................... | 328/151 |
| 5,262,679 | 11/1993 | Schweitzer, III et al. ................ | 307/127 |
| 5,309,312 | 5/1994 | Wilkerson et al. ........................ | 361/79 |
| 5,317,472 | 5/1994 | Schweitzer, III .......................... | 361/115 |
| 5,325,061 | 6/1994 | Schweitzer, III .......................... | 324/522 |
| 5,367,426 | 11/1994 | Schweitzer, III .......................... | 361/80 |

OTHER PUBLICATIONS

Asea Brown Boveri "Instructions—*Type CO Overcurrent Relay*" I.L. 41–101T, (Mar. 1988), pp. 1–21.

Asea Brown Boveri "Instructions—*Single-Phase Overcurrent Relay/Microprocessor-Based Overcurrent Relay*", IB 7.2.1.7–15, Issue C, (Feb. 1992), pp. 1–20.

*Primary Examiner*—Jeffrey A. Gaffin
*Assistant Examiner*—Stephen Jackson
*Attorney, Agent, or Firm*—Howell & Haferkamp, L.C.

[57] ABSTRACT

A relay for monitoring an electrical system to protect the electrical system from an overcurrent condition as a time dependent function of an electrical current level in the electrical system is disclosed. The relay includes a memory which stores a current level count and a current level detector coupled to the electrical system which detects the electrical current level in the electrical system over time. A microprocessor responds to the current level detector by varying the current level count in the memory as a function of the electrical current level over time. The microprocessor also detects an occurrence of the electrical current level falling below a minimum current level. A timer responds to the microprocessor by measuring a period of time during which the electrical current level is less than the minimum current level. The microprocessor responds to the timer by varying the current level count in the memory as a function of the measured period of time during which the electrical current level is below the minimum current level. A method of monitoring an electrical system to protect the electrical system from an overcurrent condition as a time dependent function of an electrical current level in the electrical system is also disclosed. Other apparatus and methods are also disclosed.

26 Claims, 11 Drawing Sheets

INTERGRATING RESET OVERCURRENT RELAY

BACKGROUND OF THE INVENTION

This invention relates to overcurrent protection devices and in particular to an integrating reset overcurrent relay which provides an integrating reset response, even during periods of time when there is a substantial drop in or loss of electrical power in the power line or power system being monitored.

Electrical power systems, such as alternating current systems, transmit and distribute electrical power to electrical loads. Time overcurrent relays are often used to protect the generators, transformers, power lines, distribution circuits and other major components of electrical power systems. In particular, time overcurrent relays are positioned to monitor the electrical current running through a portion of the electrical power system and to compare that current against a selected pickup point. When the monitored current is above the selected pickup point, timing is initiated in accordance with a selected time-current characteristic. If the current drops below the pickup point before the timing is completed, then the timing may be reset instantaneously or in some other manner as discussed below. If the monitored current exceeds the pickup point after the timing is completed, then a circuit breaker is tripped to disconnect the load from the electrical power system.

One popular construction for an overcurrent relay uses a rotatable induction disk. With no current applied, the disk is held in an initial rest position by a mechanical spring. When the applied current is of sufficient amplitude to overcome the spring force, the resulting torque rotates the disk against the spring force towards a movable limit switch. The position of the movable limit switch sets the ultimate trip point. The movable limit switch is connected to the output trip contact for customer use.

The rotational speed of the induction disk is established by the amplitude of the electrical current, the spring force, and the electromechanical properties of the disk and accompanying magnet structure. The level of current just large enough to overcome the mechanical spring force and begin the rotation of the disk toward the limit switch is called the pickup current level. An input current just slightly above pickup will result in a low rate of rotation. A large input current will cause a higher rate of rotation. When the input current level falls below the pickup current level, the disk will counter-rotate towards its initial rest position due to spring tension. The rate of this counter-rotation is again dependent on the amplitude of the electrical current, the spring force, and the electromechanical properties of the disk and accompanying magnet structure. When the input current is just slightly below the pickup current level, the disk counter-rotates slowly towards its initial rest position. When the input current falls completely to zero, the disk counter-rotates at a higher rotational rate toward its initial rest position. Levels of input current between zero and pickup will cause correspondingly different rates of disk counter-rotation towards the initial rest position. Because the net disk position is the result of the cumulative incremental rotational movements of the disk as determined by past input current amplitude and duration, such induction disk based relays are considered to have an "integrating response." The counter-rotation of the induction disk as a function of current levels less than the pickup current level is considered to provide an "integrating reset."

Another popular construction for an overcurrent relay uses electronics to program a desired relay response to a given set of input conditions. These electronic relays typically obtain the electrical power needed for their operation from a current transformer coupled to the power line being monitored. A problem with such electronic relays occurs when the current level in the power line being monitored falls completely to zero current or at least falls below the minimum power line current required for proper operation of the electronics in the relay. If such a relay is simply reset when power is restored in the power line, then the relay is unable to provide an "integrating response" in that the relay cannot account for the duration of the period when power was lost. Likewise, it is no better of a solution to simply continue operation from the point where power was lost, particularly in cases where the power is lost for a considerable period of time.

SUMMARY OF THE INVENTION

Among the objects of the present invention are to provide an improved apparatus and method for protecting an electrical power system from an overcurrent condition; the provision of such apparatus and method constructed of solid state components; the provision of such apparatus and method which compensate for periods of time when there is a substantial drop in or loss of power in the electrical power system; the provision of such apparatus and method which provides an integrating reset even during periods of time when there is a substantial drop in or loss of power in the electrical power system; the provision of such apparatus and method which mimic the function and operation of an induction disk based relay but without the need for an induction disk; the provision of such apparatus and method having electronic components for simulating the function and operation of an induction disk based relay; the provision of such apparatus and method which are reliable and easy to use; and the provision of such apparatus and method which reduce maintenance and repair costs.

Generally, in one form the invention provides a relay for monitoring an electrical system to protect the electrical system from an overcurrent condition as a time dependent function of an electrical current level in the electrical system. The relay includes a memory which stores a current level count and a current level detector coupled to the electrical system which detects the electrical current level in the electrical system over time. A microprocessor responds to the current level detector by varying the current level count in the memory as a function of the electrical current level over time. The microprocessor detects an occurrence of the electrical current level falling below a minimum current level and a timer responds by measuring a period of time during which the electrical current level is less than the minimum current level. The microprocessor responds to the timer by varying the current level count in the memory as a function of the measured period of time during which the electrical current level is below the minimum current level.

In another form the invention provides a relay for monitoring an electrical system to protect the electrical system from an overcurrent condition as a time dependent function of whether an electrical current level in the electrical system exceeds a pickup current level. The relay is energized by the electrical system during periods of time when the electrical current level exceeds a minimum current level needed for operation of the relay. The relay changes the state of an electrical contact in response to electrical current levels in excess of the pickup current level over time. The relay includes a memory which stores a current level count and a circuit which varies the current level count over time as a function of whether the electrical current level is greater than or less than the pickup current level. The circuit changes the state of the electrical contact as a function of the current level count. The relay also includes a timer which measures a duration of an elapsed period of time beginning about when the electrical current level falls below the minimum current level and ending about when the electrical current level rises above the minimum current level. The circuit adjusts the current level count at the end of the elapsed period as a function of the measured duration of the elapsed period.

In yet another form, the invention provides a method of monitoring an electrical system to protect the electrical system from an overcurrent condition as a time dependent function of an electrical current level in the electrical system. The method includes the steps of storing a current level count and detecting the electrical current level in the electrical system over time. The method also includes the steps of varying the current level count as a function of the electrical current level over time and measuring a period of time during which the electrical current level is less than the minimum current level. The method also includes the step of varying the current level count as a function of the measured period of time during which the electrical current level is below the minimum current level.

Other objects and features will be in part apparent and in part pointed out hereinafter.

DETAILED DESCRIPTION OF PREFERRED EMBODIMENTS

Figure 1:
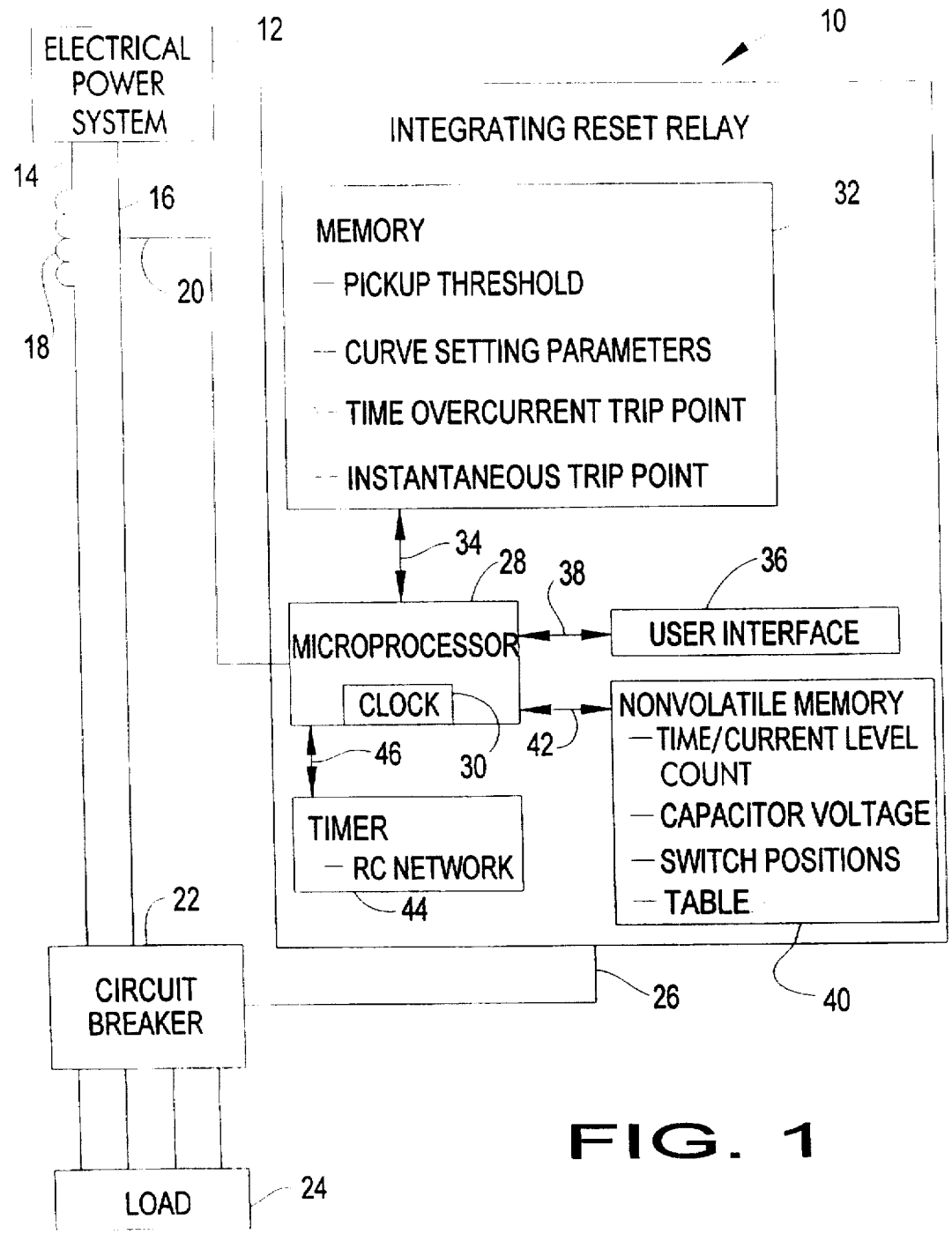
FIG. 1 shows a block diagram for an integrating reset overcurrent relay of the present invention.

FIG. 1 shows a block diagram of an integrating reset overcurrent relay indicated generally at 10 constructed in accordance with the principles of the present invention. Relay 10 monitors the current in an electrical power system 12 or other circuit to be protected. The power system 12 that is shown in FIG. 1 is a single-phase power system; however, power system 12 may also be a polyphase power system such as the commonly found three-phrase alternating current power systems. Power system 12 may likewise be any other circuit element to be protected from excess currents. As shown in FIG. 1, power system 12 includes a line 14 and a neutral or ground line 16. A current transformer 18 is schematically shown coupled to line 14 for sensing the current in line 14. Current transformer 18 produces a current signal which varies as a function of the current level in line 14. The current signal produced by current transformer 18 is detected by relay 10 via a line 20. A circuit breaker 22 is provided for disconnecting the power system 12 from a load 24 upon the occurrence of a fault condition, such as an overcurrent condition. Circuit breaker 22 is controlled by relay 10 via a line 26.

Relay 10 in FIG. 1 includes a microprocessor 28 including a clock 30 for controlling the timing of relay 10. A memory 32 is connected to microprocessor 28 via a databus 34. Memory 32 stores data corresponding to the pickup threshold, curve setting parameters, a time overcurrent trip point, and an instantaneous trip point. Relay 10 also includes a user interface 36, such as a keyboard, mouse, or similar device. User interface 36 allows the user to vary the data stored in memory 32 to adjust the operation of relay 10 to the user's preference. User interface 36 is connected to microprocessor 28 via a databus 38.

Relay 10 also includes a nonvolatile memory 40. Nonvolatile memory 40 includes data corresponding to a time/current level count, a capacitor voltage, the positions of the external switches of relay 10 as set by the user, and a table of values as described more fully below. Nonvolatile memory 40 is connected to microprocessor 28 via a databus 42. As a matter of practice, memory 32 and memory 40 may be combined so long as the current level, capacitor voltage, switch position and table data elements are stored in a nonvolatile section of the memory. Memory 32 and memory 40 may also be implemented using some or all of the memory elements in commonly available microprocessors such as microprocessor 28. Relay 10 also includes a timer 44 such as an RC network or other suitable timing device. Timer 44 is connected to microprocessor 28 via a databus 46.

In operation, microprocessor 28 maintains and adjusts a variable identified as the time/current level count in memory 40. The time/current level count varies as a function of the current level in line 14 over time. Microprocessor 28 may be programmed to vary the time/current level count to cause relay 10 to simulate a conventional induction disk based relay or any other type of relay having any type of time/current characteristic response. Likewise, microprocessor 28 may be programmed with any type of time/current characteristic response per the curve setting parameters stored in memory 32.

In the situation where an induction disk based relay is being simulated by relay 10, microprocessor 28 sets the time/current level count to zero or to some other baseline count at startup. The time/current level count remains at the baseline count until such time as the current level in line 14 (indicated by the current signal produced by current transformer 18) exceeds the pickup threshold (stored in memory 32). Once the pickup threshold is exceeded, microprocessor 28 is programmed to increase the time/current level count as a function of the curve setting parameters stored in memory 32. When relay 10 is programmed to simulate an induction disk based relay, the curve setting parameters stored in memory 32 are chosen appropriately using conventional curve setting techniques.

The time/current response of relay 10 can be adjusted to a particular induction disk based relay through the selection of suitable operating parameters via user interface 36. For example, user interface 36 is used to input a pickup threshold, curve setting parameters, a time overcurrent trip point and an instantaneous trip point into memory 32. (Other curve setting parameters may also be used within the scope of the invention.) During periods of time when the current level in line 14 drops below the pickup threshold, microprocessor 28 is programmed to decrease the time/current level count as a function of the curve setting parameters stored in memory 32. If the time/current level count ever reaches or exceeds the time overcurrent trip point stored in memory 32, then microprocessor 28 controls relay 10 to disconnect load 24 from power system 12 via circuit breaker 22 and line 26. This situation indicates an overcurrent condition and is equivalent to the situation where the induction disk rotates far enough to activate the limit switch in a conventional induction disk based relay.

It is noted that memory 32 also stores an instantaneous trip point value. If the current level in line 14 ever exceeds the level corresponding to the instantaneous trip point value stored in memory 32, even for an instant, then microprocessor 28 again controls relay 10 to disconnect load 24 from power system 12 via circuit breaker 22 and line 26.

A problem solved by the present invention occurs when the current signal on line 20 supplies insufficient power to operate the circuitry of relay 10 for a period of time when little or no electrical power is flowing through line 14. More particularly, for a relay which obtains its electrical power from the input current signal that it is sensing in the power line, a minimum level of input current is necessary to successfully bring the internal power supplies of relay 10 up to a proper operating voltage level. On a typical 5 amp (nominal) range relay, 0.5 amps are required to bring the power supplies up to operating limits. Input current below approximately 0.5 amps in line 14 will cause a loss of regulation of the internal power supplies. During this period of time when there is a loss of regulation of the internal power supplies, a conventional electronic relay is unable to simulate the integrating reset of an induction disk relay.

The problem is that conventional circuitry cannot account for the time period when the power was insufficient and so cannot provide an accurate integrating reset response. For example, if the conventional circuitry simply resets upon the loss of power, then the integrating response of the induction disc is lost because the time/current level count will simply be reset to zero with each loss of power instead of being slowly decreased toward zero in simulation of a counter-rotating induction disk. This is particularly important in cases where the loss of power is for a relatively short period of time and where the time/current level count is relatively large due to the current level in line 14 having exceeded the pickup threshold prior to the loss of power. On the other hand, if the time/current level count is simply held constant through the power loss, then this does not solve the problem either because the count should be decreased in simulation of an induction disk during the period of the power loss. This is particularly important in cases where the loss of power is for a relatively long period of time and where the time/current level count is relatively large due to the current level in line 14 having exceeded the pickup threshold prior to the loss of power.

Relay 10 in FIG. 1 solves the problem by using a timer, preferably an RC timer, to measure the period of each loss of power. Then, knowing the period of power loss and knowing the characteristic counter-rotation rate at no power for the induction disc to be simulated, microprocessor 28 decreases the time/current level count by a corresponding amount when sufficient electrical power is again available to power the electronics in relay 10.

For example, if the induction disk to be simulated counter-rotates 30° for each 10 second period of power loss and if the time/current level count is scaled for 10 counts per second of power loss, then 100 counts corresponds to 30° of counter-rotation and the time/current level count is decreased (toward zero) by 100 counts for each 10 seconds of power loss. In this way, the integrating reset of a conventional induction disk based relay is simulated electronically with relay 10 without the need for a conventional induction disk.

By way of greater explanation, the rotation of the induction disk towards it rest position with zero input current in a conventional induction disk relay can be simulated by measuring the time duration between loss of power supply voltage and reestablishment of that same power supply voltage. If it is assumed that there is a total loss of input current each time the power supply voltage falls below its normal operating range, (i.e., input current=zero), then the position of the induction disk can be approximated since it would counter-rotate towards its rest position at a constant rate as a function of the spring constant. This rate (R) is fixed for any given 'curve type' of relay, (e.g., Short=S, Long=L, Inverse=I). The time to rest ($T_R$) from an initial tripped condition to the fully reset state for any curve is found as follows:

$$T_R = (R \cdot D)/(M^2 - 1) \quad 0 \leq M < 1 \qquad [1]$$

In Equation [1], "M" stands for the multiple of the pickup current, "D" is the time dial setting, and "R" is the reset constant (curve dependent). It is noted that $T_R$ in Equation [1] produces a negative time value during periods when the simulated disk would be counter-rotating away from the trip condition. When the input current is zero, M=0 and Equation [1] reduces to:

$$T_R = -R \cdot D \qquad [2]$$

Equation [2] shows that the full reset time for an induction disc relay with zero input current is fixed for a given curve type and time dial setting. Likewise, if the input power falls to zero for only part of the full reset time, then the disk will only be partially reset. This is because the disk position at the return of power is equal to the disk position at the loss of power minus the length of time power is off multiplied by the rate of rewind.

As an example, an induction disk relay may be set for a Time Dial of 1.0 corresponding to 30° of disk rotation and:

Curve Type=I; (Inverse Curve);

R (Type I)=9/30°; and

Time Dial=D=5.0=150°.

In this example, the reset constant equals 9 sec/Time Dial of 1.0 which equals 9 sec/30° in units of sec/degree. The trip condition equals 5·30° or 150° of disk rotation. The full reset time $T_R$ equals (9 sec/30°)·150° which equals 45 seconds. This means that if the disk has reached the trip condition (150°) and then power is lost, it will take 45 seconds for the induction disk to rotate back to its full rest position (0°). Similarly, if the disk is at a position of 120° when input power is lost, it will only take (9 sec/30°)·120° or 36 seconds for the disk to reach its rest state. Likewise, if the disk position is 120° when input power is lost and then power is restored after only 18 seconds, the disk would be positioned at 120°-18 sec/(9/30°) or 60° when power is restored.

One purpose of the present invention is to be able to determine the equivalent position of the simulated induction disk at the return of power so that subsequent input current will correctly trip the relay. This is accomplished by measuring the trip condition as a function of the number of counts in the variable time/current level count. When this count meets or exceeds the time overcurrent trip point stored in memory 32, a trip condition is indicated. Again, microprocessor 28 maintains and adjusts the time/current level count with an integration algorithm based on the level of current in line 14 as compared to the pickup threshold. Microprocessor 32 thereby monitors the input current conditions (i.e., M value) and performs a mathematical integration based on a predetermined timing algorithm. This algorithm calculates the running count stored as the time/current level count which is proportioned to the percent of trip, or in other words, proportional to the angular position of the simulated induction disk in an equivalent induction disk relay. This algorithm continually monitors the M value and adjusts the running time/current level count while continually checking to see if a trip condition is met.

In order to properly mimic the induction disk when power is lost. relay 10 includes timer 44 for measuring the period of time that power is lost. Timer 44 is preferably an RC network. Microprocessor 28 controls switches (not shown in FIG. 1, but shown and explained in greater detail below for FIGS. 2 through 11) to charge a capacitor in the RC network during periods of time when power is available. Just before power is lost, microprocessor 28 isolates the capacitor, measures the voltage across the capacitor, and stores the measured voltage in nonvolatile memory 40. Microprocessor 28 also stores the then existing time/current level count in nonvolatile memory 40. The capacitor is then allowed to discharge through a resistor in the RC network during the period of time when power is lost. For example, given a capacitor which is charged to some voltage level ($V_{off}$), it is known that the voltage will decay over time based on the following discharge equation:

$$V(t)=V_{off}e^{-t/RC} \quad [3]$$

In Equation [3], RC equals the time constant of the RC network, $V_{off}$ equals the initial capacitor voltage in volts, e equals the natural log (2.718...), and V(t) equals the voltage at time t. Given that the capacitor C and the discharge resistor R are constant, the voltage V(t) will follow a repeatable discharge curve per the discharge equation. When power is restored, microprocessor 28 measures the voltage across the capacitor a second time, recalls the initial voltage measurement from nonvolatile memory 40, and then takes the ratio Vr of the two voltage measurements. The ratio Vr is calculated as follows:

$$Vr=Von/Voff \quad [4]$$

This value of Vr is used as an index into a stored listing (lookup table) of constants within memory 40. Since the exponential decay rate of the RC network is fixed by the value of the capacitor and the discharge resistance, the voltage on the capacitor has a predictable value at any given point in time. A table of constants is stored in memory that is basically a list of values of the exponential decay of the capacitor voltage as a function of time. The length of time that power has been off is thus determined by indexing an amount 'Vr' into this lookup table. Stored at location 'Vr' in this table is the value of time that corresponds to a voltage of 'Vr'. The table is simply a list of solutions to the equation $t=-R \cdot C \cdot \ln V_r$, where ln is the natural log function. At the location 'Vr' of the table is stored the time 't' found by $t=-R \cdot C \cdot \ln V_r$. Microprocessor 28 accesses a table of values stored in memory 40 which relates the voltage ratio to the time that power was lost. Microprocessor 28 thereby determines the period of time that power was lost. Since the rate of rewind during power loss is a constant over time, the amount of rewind is thus known and the time/current level count is decreased accordingly. This new time/current level count simulates the disk position of the induction disk relay upon the restoration of power. The time/current level count is preferably stored in memory 40 as a binary number and is continually changed based on the integration algorithm implemented in software.

In practice, since: (1) the voltage ratio Vr uniquely determines the period of time during which power was off; and (2) the period of time power was off uniquely determines the amount of rewind (since the rate of rewind is constant over time), those skilled in the art may practice the invention using only a single table of values which relates the voltage ratio Vr to an adjustment value for the time/current level count indicative of the corresponding amount of rewind.

As an example, assume Voff=8.5 volts (measured at loss of power), Von=4.25 volts (measured at restoration of power) and RC=100 seconds (time constant of the reference capacitor-resistor network). Thus, Vr=4.25/8.5=0.5 and the value of time that corresponds to 0.5 in the table is now looked up by the microprocessor. For a time constant of 100 seconds, this time $t=-R \cdot C \cdot \ln V_r=69.32$ seconds. As another example, assume Voff=8.5 volts (measured at loss of power), Von=7.5 volts (measured at restoration of power) and RC=100 seconds (time constant of reference capacitor-resistor network). In this second example, Vr=7.5/8.5= 0.882. The value of time that is stored at 0.882 in the table in memory 40 for a time constant of 100 seconds is $t=-R \cdot C \cdot \ln V_r=12.56$ seconds. Because the length of time power was off has now been determined in both of these examples, the corresponding adjustment to the time/current level count indicative of the simulated induction disc position is quickly determined. To wit, because the disk position at the return of power is equal to the disk position at the loss of power minus the length of time power was off multiplied by the rate of rewind, all of which are now known to microprocessor 28, microprocessor 28 now calculates the new equivalent disk position at the time of return of power: (1) the disk position at the loss of power is read back from the nonvolatile memory when power is restored; (2) the length of time the power was off is determined via the lookup table in memory 40 as above; (3) the rate of rewind for the simulated induction disc is a constant for any given curve type. The equivalent disk position is thus determined so that the timing of the pickup current conditions can resume.

For applications where relay 10 is not necessarily programmed to mimic an induction disk based relay but, rather, is programmed to monitor an electrical current level in an electrical system according to any given function programmed in its memory, then the length of time the power was off is again determined via the lookup table in memory 40 as described above. Instead of varying the time/current level count to mimic an induction disc at the end of the period when power is restored, however, the given function programmed in the memory is used to vary the time/current level count as a function of the length of time the power was off. Thus, knowing the length of time the power was off and assuming little or no electrical current during such time, microprocessor 28 quickly calculates what the time/current level count would have been when power was restored had microprocessor 28 been operational throughout the period of power loss. In this way, relay 10 can be used to provide an "integrating reset" given any time/current function for monitoring the current level in an electrical system.

Figure 2:
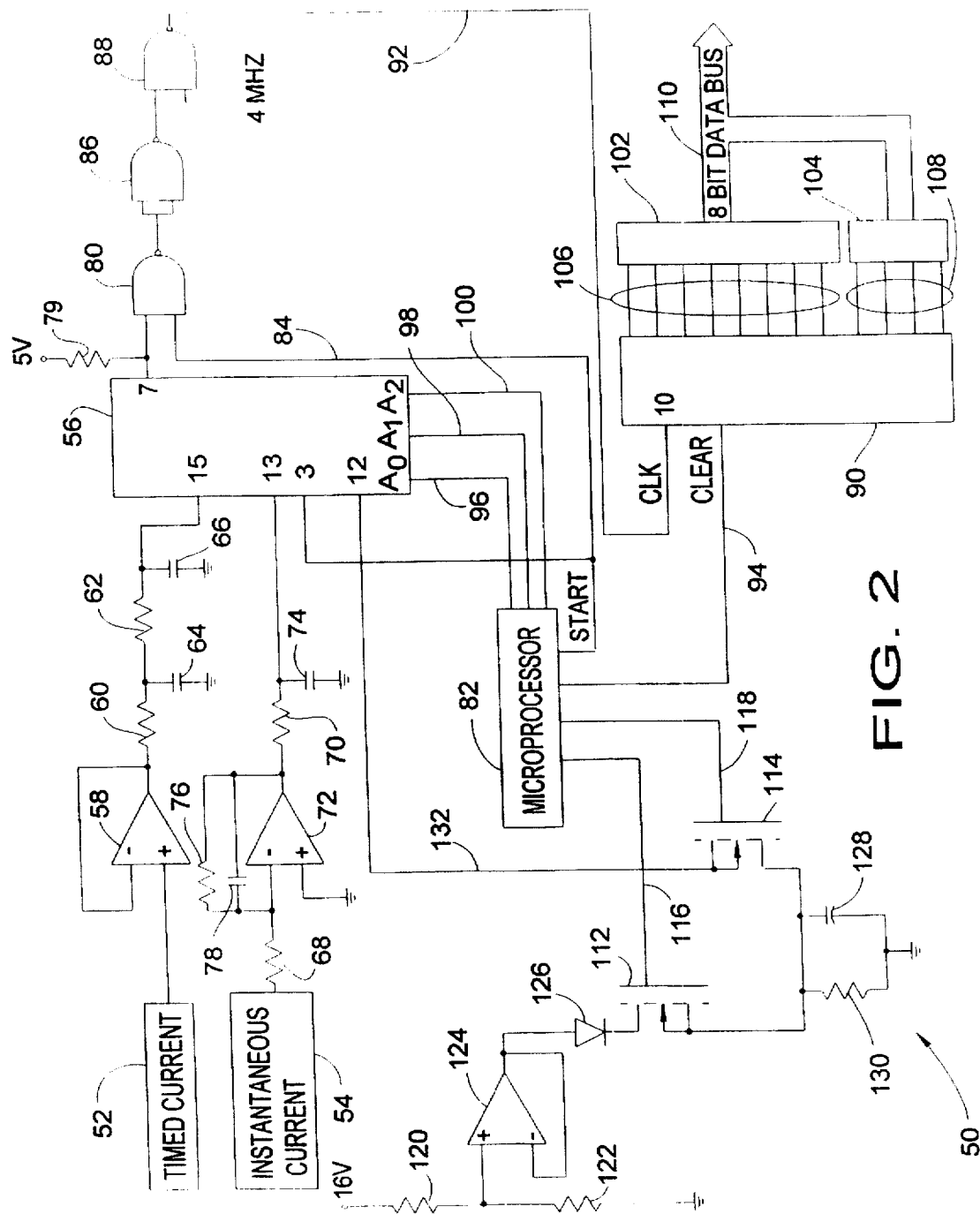
FIG. 2 shows a partial schematic diagram for an integrating reset overcurrent relay of the present invention.

FIG. 2 shows a partial schematic diagram for an integrating reset relay 50 of the present invention. Relay 50 receives a timed current signal 52 and an instantaneous current signal 54 via current transformers (not shown) coupled to transmission lines in the power distribution system to be protected. Timed current signal 52 is connected to a pin 15 of an analog pulse width converter 56 via an amplifier 58, resistors 60 and 62, and capacitors 64 and 66. The output of amplifier 58 is also connected to its negative input terminal. The instantaneous current signal 54 is connected to a pin 13 of converter 56 via resistors 68 and 70, an amplifier 72 and a capacitor 74. A resistor 76 and a capacitor 78 are connected in parallel across the output of amplifier 72 and the negative input terminal of amplifier 72.

The output of converter 56 is supplied via a pin 7 to an input of a NAND gate 80. Pin 7 is also connected to a 5V source via a resistor 79. The other input of NAND gate 80 is connected to a microprocessor 82 via a line 84. The output of NAND gate 80 is connected to the inputs of a NAND gate 86. The output of NAND gate 86 is connected to one of the inputs of a NAND gate 88. The other input of NAND gate 88 is connected to a 4 MHz source. The output of NAND gate 88 is connected to the clock input of a counter 90 via a line 92. Microprocessor 82 is also connected to the clear input of counter 90 via a line 94. Microprocessor 82 controls converter 56 via lines 96, 98 and 100 which are connected, respectively, to inputs $A_0$, $A_1$, and $A_2$ of converter 56.

The output of counter 90 is supplied to buffers 102 and 104 via lines 106 and 108, respectively. Buffers 102 and 104 buffer the data supplied on lines 106 and 108 and output such data via an 8 bit databus 110 to microprocessor 82. Microprocessor 82 thereby receives the count value output by counter 90 each time counter 90 outputs any particular count.

Microprocessor 82 is also connected to field effect transistors 112 and 114 via lines 116 and 118, respectively. The drain of transistor 112 is connected to a 16 volt power source via voltage dividing resistors 120 and 122, an amplifier 124, and a diode 126. The output of amplifier 124 is also connected to its negative input terminal. The source of transistor 112 is connected to ground via a capacitor 128 and a resistor 130. The source terminal of transistor 114 is connected to a pin 12 of converter 56. The drain terminal of transistor 114 is connected to ground via capacitor 128 and resistor 130.

In operation, timed current signal 52 in FIG. 2 is scaled via known means to provide a range of values corresponding to various current levels in the electrical line of the power distribution system to be protected. Likewise, instantaneous current signal 54 is also scaled to provide a range of values corresponding to the instantaneous current levels in the electrical line to be protected in the power distribution system. Timed current signal 52 and instantaneous current signal 54 are further processed via the electrical circuitry which connects them, respectively, to pins 15 and 13 of converter 56.

Converter 56 is under the control of microprocessor 82 via inputs $A_0$, $A_1$, $A_2$ and "start" of converter 56. Microprocessor 82 reads the value of timed current signal 52 by applying the appropriate inputs to converter 56 so that the output signal at pin 7 of converter 56 is controlled as a function of the input signal appearing at pin 15. This is how microprocessor 82 begins a measurement of the channel selected by $A_0$, $A_1$ and $A_2$ of converter 56. Likewise, microprocessor 82 reads the instantaneous current signal level 54 by applying the appropriate inputs so that output signal appearing at pin 7 of converter 56 is controlled as a function of the input signal appearing at pin 13.

In order to read the output signal at pin 7, microprocessor outputs a logical level 1 on line 84 to enable NAND gate 80. The output signal of NAND gate 80 is then processed by NAND gate 86 and supplied to the input of NAND gate 88 where it is combined with a 4 MHz signal. The output of NAND gate 88 is a burst of pulses having a total count which is determined as a function of the value of timed current signal 52 or instantaneous current signal 54, depending upon which signal is being read at the time. Counter 90 counts the total number of pulses in a given burst via the clock input at 10. Following a burst of pulses from NAND gate 88, the total number of pulses is determined from the output of counter 90 appearing on lines 106 and 108.

Microprocessor 82 controls buffers 102 and 104 to read buffers 102 and 104 at separate times so that the 12 bit data from counter 90 can be transmitted via 8 bit databus 110 in two parts. Accordingly, microprocessor 82 monitors 8 bit databus 110 in order to determine the value of timed current signal 52 and instantaneous current signal 54. It is recognized by those skilled in the art that microprocessor 82 can receive the values of signals 52 and 54 at any time by controlling inputs $A_0$, $A_1$, $A_2$ and start of converter 56, placing a logic level 1 signal on line 84, clearing counter 90 via line 94 so that counter 90 can count the total number of pulses in the burst produced by NAND gate 88 and then monitoring 8 bit databus 110 to obtain the pulse count.

Microprocessor 82 is programmed with data for relating the values of signals 52 and 54 as available on 8 bit databus 110 into a protection scheme for limiting the current levels in the transmission line of the distribution system to be protected. For example, during periods of time when microprocessor 82 is programmed to mimic an induction disk relay, microprocessor 82 will maintain a time/current level count in a memory (not shown). During extended periods of time when the timed current signal 52 indicates that the current in the transmission line to be protected is below the pickup value, the time/current level count in the memory preferably remains at zero or some other baseline value. As the current level in the transmission line to be protected rises above the pickup level value, microprocessor 82 is programmed with algorithms common to those skilled in the art which increase the time/current level count stored in the memory. An example of such algorithms are the induction disc simulation algorithms explained above for FIG. 1. If the current level in the transmission line to be protected remains above the pickup current level for too long of a period of time, the time/current level count will continue to increase until it reaches a threshold value. When microprocessor 82 detects that the time/current level count has equalled or exceeded this threshold value, microprocessor 82 is programmed to throw a relay switch via circuitry not shown which switches off further current to the transmission line.

During situations where the time/current level count rises above zero or the baseline value as a result of the current in the transmission line exceeding the pickup value, microprocessor 82 will continue to monitor the current level in the transmission line until the current level either begins to fall or else remains too high for too long causing the relay to be tripped. During periods where the current level begins to fall or where the relay is opened, microprocessor 82 is further programmed to reduce the time/current level count in the memory as a function of how far the current level in the line is below the pickup value. This is a time dependent function as explained above.

One problem that arises in conventional solid state relays occurs when power falls below a minimum level or is lost entirely in the line to be protected. In this event, there is insufficient electrical power to operate the electronic circuitry in relay 50 because relay 50 relies on current transformers coupled to the transmission line for generating power to operate the electronics. It is found in practical applications that, when the line current level falls below 0.5 amps, the electronics of relay 50 will have insufficient electrical power to continue operating in a satisfactory fashion. The circuitry of FIG. 2 accounts for such periods of low power as described below. First, microprocessor 82 detects that the current level in the transmission line is falling near the minimum current level required for operation of relay 50 via either timed current signal 52 and/or instantaneous current signal 54. When the low current threshold is reached, microprocessor 82 responds by switching off transistor 112 via line 116 and switching on transistor 114 via line 118. Microprocessor 82 then reads the voltage output by capacitor 128 via a line 132, converter 56, NAND gate 88 and counter 90. The count thus output by counter 90 to microprocessor 82 via databus 110 is the number of pulses output by NAND gate 88 which is representative of the voltage on capacitor 128. This pulse count is stored in a non-volatile memory along with the time/current level count.

At a later time, after the current level in the transmission line rises above the low current threshold, microprocessor 82 again reads the voltage on capacitor 128 via transistor 114,line 132, converter 56, NAND gate 88, counter 90, and databus 110. Microprocessor 82 includes a memory which stores a table of values which relates the ratio of the voltage measured on capacitor 128 before a loss of power to the voltage on capacitor 128 after the loss of power to the period of time the power was lost. A second table is then used to relate the period of time the power was lost to the amount by which the time/current level count should be reduced in order to mimic the action of a mechanical induction disk relay. The equations for this are described above for the block diagram of FIG. 1.

Microprocessor 82 also monitors instantaneous current signal 54 and compares it against an instantaneous threshold. If the instantaneous current signal 54 ever exceeds the instantaneous current threshold, microprocessor 82 initiates the power loss procedures set forth above and then immediately switches off the relay thereby protecting the transmission lines from such instantaneous currents.

FIGS. 3–11 show a schematic diagram for implementing an integrating reset relay of the present invention. The 900 series numbers which appear in FIGS. 3–11 indicate the connections between the figures. For example, a terminal 900 appears in FIG. 3 and in FIG. 4. In practice, there would be no distinct terminal 900. Rather, the line connected to terminal 900 in FIG. 3 will be continuous with the line connected to terminal 900 in FIG. 4. The same is respectively true for all of the other 900 series terminals in FIGS. 3–11.

Figure 3:
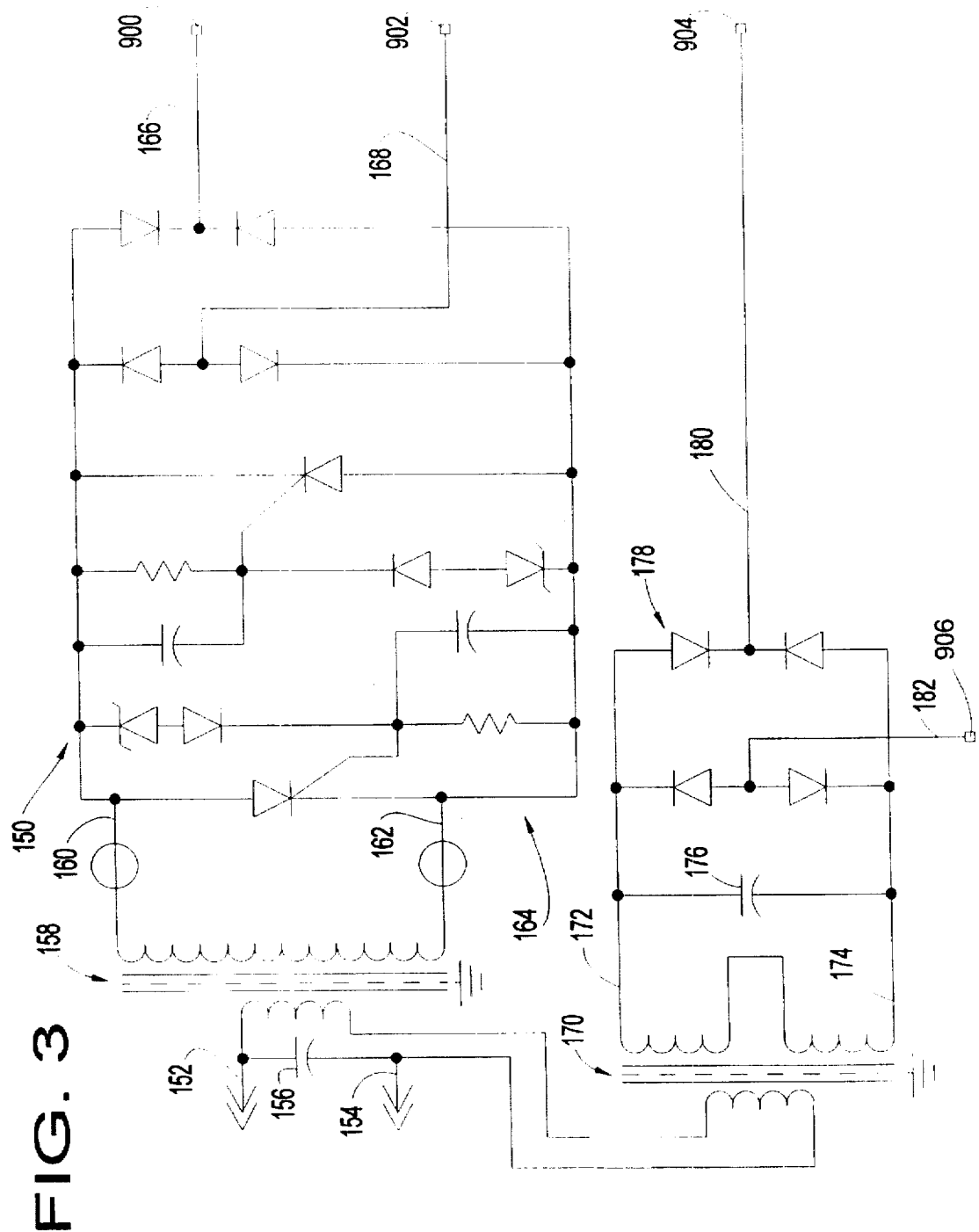
FIGS. 3 through 11 together show a schematic diagram for an integrating reset overcurrent relay of the present invention.
Figure 4:
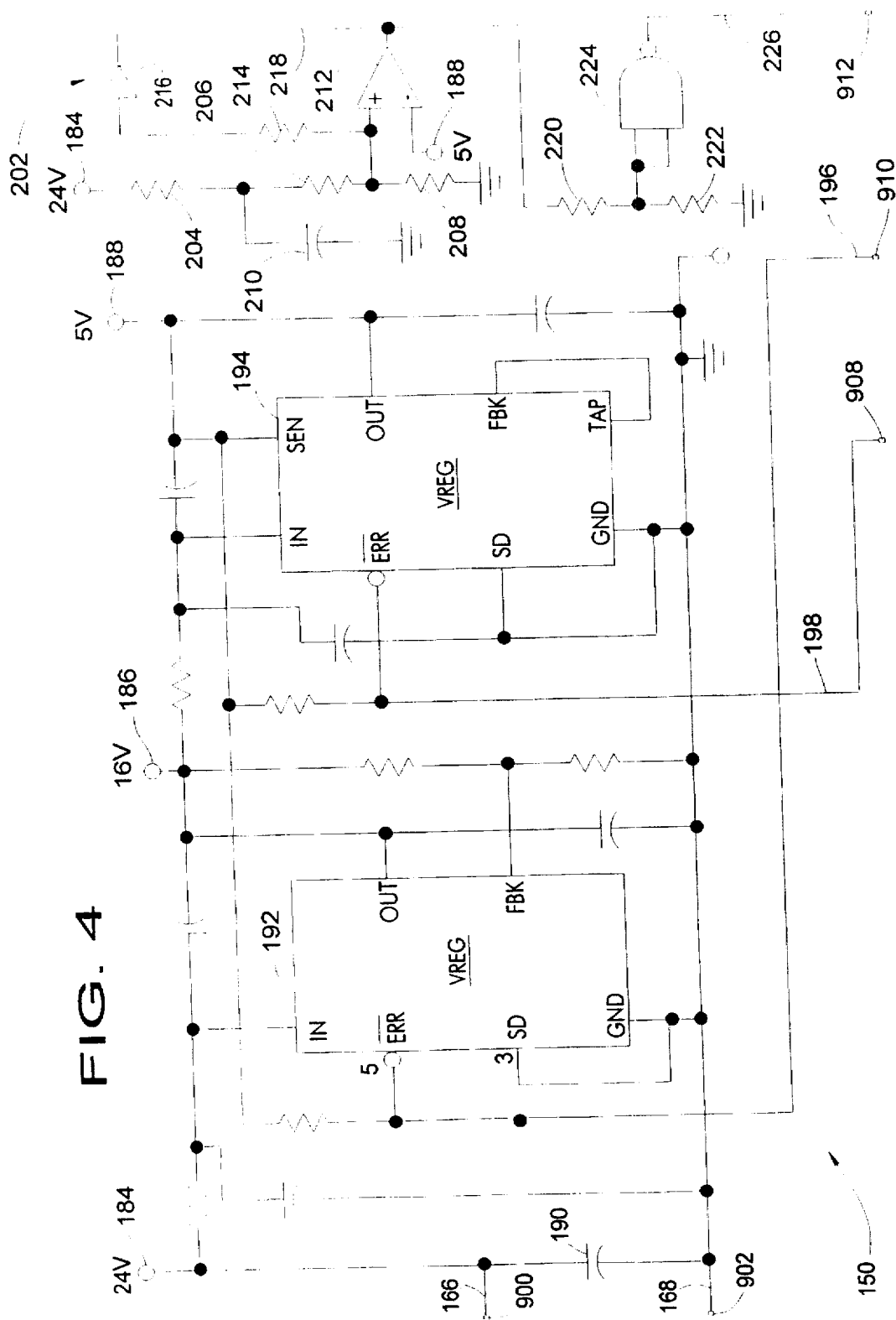

FIG. 3 shows part of a power supply 150. The rest of power supply 150 is shown in FIG. 4. Lines 152 and 154 are connected to a current transformer which is coupled to the transmission line to be protected. Accordingly, lines 152 and 154 provide electrical power to the circuitry of FIG. 3 during periods of time when sufficient current is flowing through the transmission line. A capacitor 156 is connected across lines 152 and 154 to suppress electrical noise. A transformer 158 transforms the current appearing in lines 152 and 154 to a current suitable for power supply 150 which is supplied via lines 160 and 162. A rectifier circuit 164 conditions and full wave rectifies the current in lines 160 and 162 to produce a direct current on lines 166 and 168. The direct current running through lines 166 and 168 is then filtered and regulated by the circuitry shown in FIG. 4 as explained more fully below.

FIG. 3 also includes a transformer 170 having its primary winding connected to lines 152 and 154. The secondary winding of transformer 170 is connected to lines 172 and 174. A capacitor 176 filters the electrical signal on lines 172 and 174. A full wave rectifier circuit 178 rectifies the signal to produce a DC signal output on lines 180 and 182. The DC signal output on lines 180 and 182 is the signal used for measuring the current in the transmission line to be protected, as explained more fully below.

FIG. 4 shows the remaining portions of power supply circuit 150. FIG. 4 includes a tap 184 for providing a 24 volt power source, a tap 186 for providing a 16 volt power source, and a tap 188 for providing a 5 volt power source. A capacitor 190 provides a primary filter for power supply circuit 150. Tap 184 is connected directly to line 166 for supplying the 24 volt power source. A voltage regulator 192 is connected with its associated resistors and capacitors of known construction to supply a regulated and filtered 16 volt power source at tap 186. A voltage regulator 194 is connected with its associated resistors and capacitors of known construction to supply a 5 volt power source at tap 188. Lines 196 and 198 are connected to voltage regulators 192 and 194, respectively, for connection to a microprocessor on microcontroller 200 in FIG. 9, as explained below. Microcontroller 200 thereby detects whether the power provided by the power supply circuit 150 is in regulation. If not, microcontroller 200 shuts down the circuit as explained more fully below.

FIG. 4 also includes a low power detection circuit 202. Low power detection circuit 202 is connected to taps 184 and 188 for sensing the level of available power. Low power level circuit 202 includes resistors 204, 206 and 208 connected between the tap 184 and ground. A capacitor 210 is connected between resistors 204 and 206 and ground. A comparator 212 has its negative terminal connected to tap 188 and its positive terminal connected between resistors 206 and 208. A resistor 214 is also connected at one end to the positive terminal of comparator 212 and at the other end to a diode 216. The cathode of diode 216 is connected to the output of comparator 212. A line 218 supplies the output of comparator 212 across voltage dividing resistors 220 and 222. The inputs of a NAND gate 224 are connected between resistors 220 and 222. The output of NAND gate 224 is a low power level signal carried by line 226.

In operation, during periods of time when the current through the transmission line to be protected is above the minimum current level required for operation of the circuitry, the output of NAND gate 224 on line 226 is a logic level zero. As the current through the transmission line falls below the minimum level required for proper operation of the circuitry, low level circuitry 202 signals the fallen current level by outputting a logic level 1 signal from NAND gate 224. This indicates to the rest of the circuitry via line 226 that power is being lost and that the shutdown procedures described below must be initiated.

Figure 5:
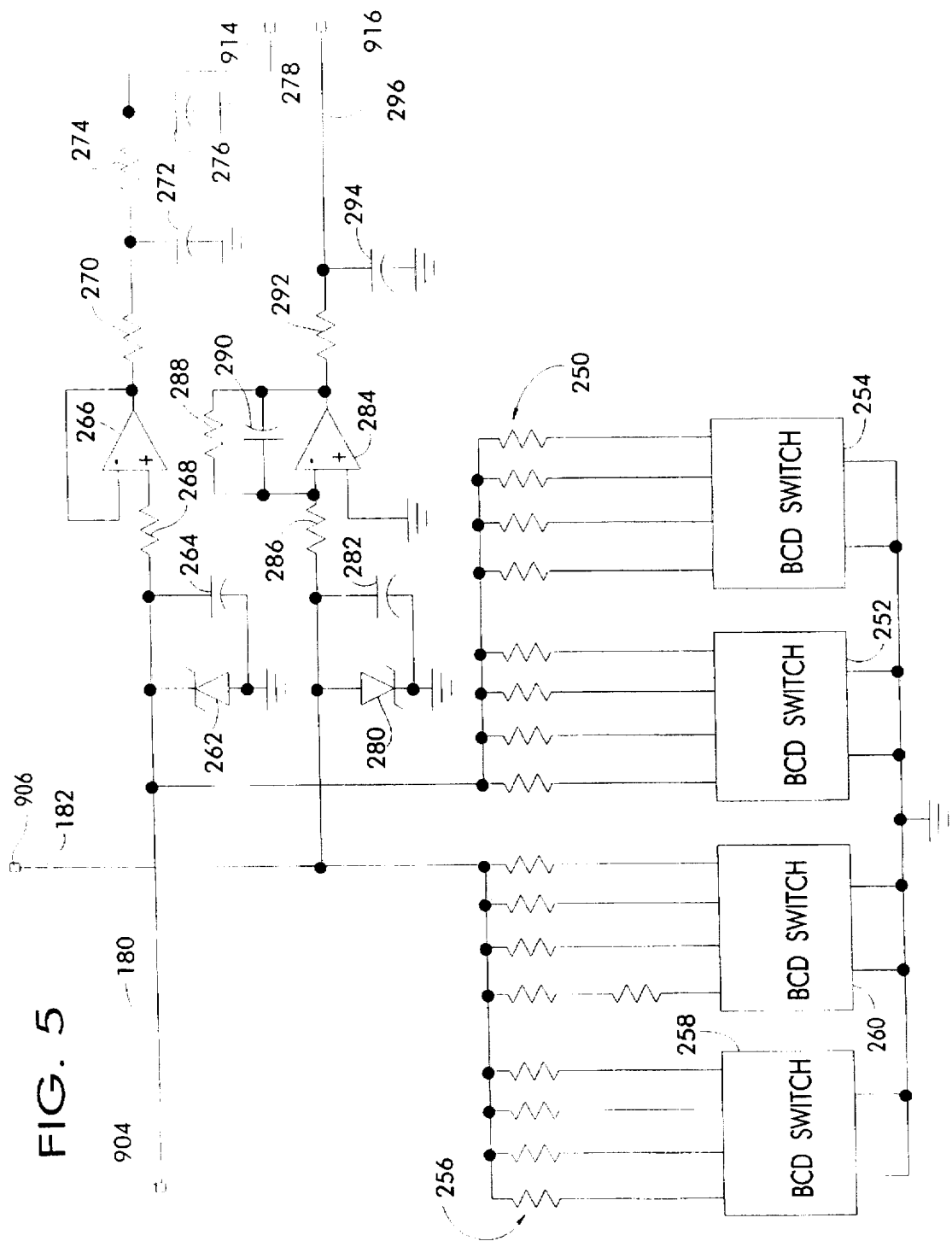

FIG. 5 shows the circuitry used for scaling the current signal on lines 180 and 182. Line 180 is connected to one end of resistors 250. The other end of resistors 250 is connected to BCD switches 252 and 254. BCD switches 252 and 254 selectively connect one terminal of resistors 250 to ground voltage. By setting BCD switches 252 and 254 to a desired position, a given set of resistors 250 are connected in parallel between line 180 and ground. This scales the input current signal on line 180 to a desired voltage level.

Likewise, resistors 256 are connected at one end to line 182. The other end of resistors 256 is connected to BCD switches 258 and 260. BCD switches 258 and 260 selectively connect resistors 256 to ground level voltage. By setting BCD switches 258 and 260 to a desired position, a given set of resistors 256 are connected in parallel between line 182 and ground. This scales the input current signal on line 182 to a desired voltage level.

FIG. 5 also shows a zener diode 262 connected in parallel with a capacitor 264 between line 180 and ground level voltage. Line 180 is also connected to the positive terminal of an amplifier 266 via a resistor 268. The output of amplifier 266 is input to the negative terminal of amplifier 266. The output of amplifier 266 is also filtered by resistor 270, capacitor 272, resistor 274 and capacitor 276 to provide a scaled and filtered voltage signal on a line 278.

FIG. 5 also shows a zener diode 280 connected in parallel with a capacitor 282 between line 182 and ground level voltage. Line 182 is also connected to the negative terminal of an amplifier 284 via a resistor 286. A resistor 288 is connected in parallel with a capacitor 290 between the output of amplifier 284 and the negative terminal of amplifier 284. The output of amplifier 284 is also filtered by a resistor 292 and capacitor 294 to provide a scaled and filtered voltage signal on a line 296.

Figure 6:
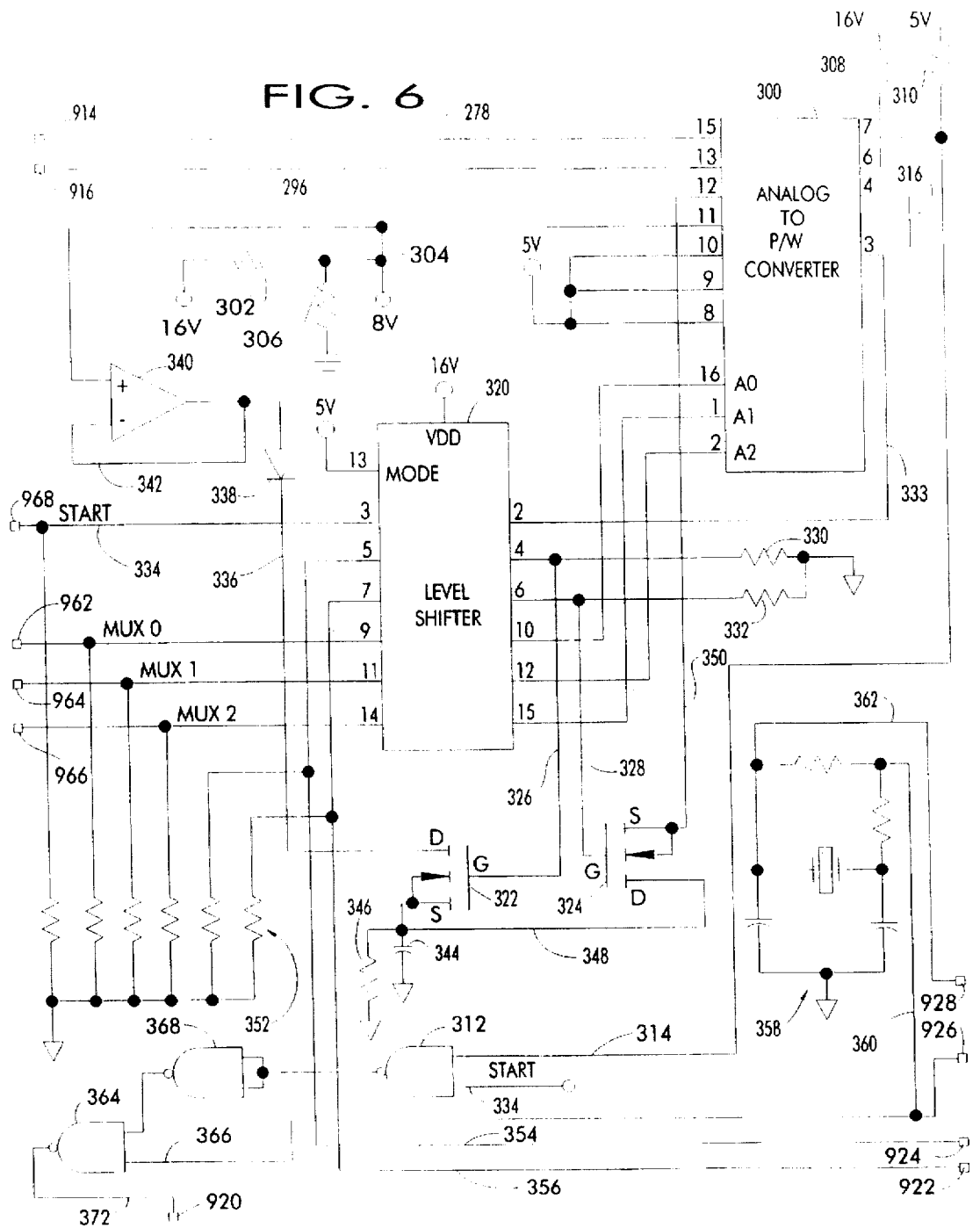

FIG. 6 shows that the scaled and filtered voltage signal on line 278 is connected to pin 15 of an analog to pulse width converter 300. The scaled and filtered voltage signal on line 296 is connected to pin 13 of converter 300. The scaled and filtered voltage signal on line 278 is preferably scaled for use as a timed current signal for protecting against overcurrents in the transmission line which occur over time. The scaled and filtered signal on line 296 is preferably scaled for use as an instantaneous current signal for turning off the electrical power in the transmission line in the event the instantaneous current level in the transmission line exceeds a peak threshold value, even if only for an instant.

Pins 8, 9 and 10 of converter 300 are connected to a 5 volt power source. A 16 volt power source is connected via resistor 302 and a line 304 to pin 11 of converter 300. A resistor 306 is connected between electrical ground and the terminal of resistor 302 opposite the 16 volt power supply. The 16 volt power supply is also connected to pin 6 of converter 300 via a resistor 308. The 5 volt power supply is connected to pin 7 of converter 300 via resistor 310. Pin 7 of converter 300 is also connected to an input of NAND gate 312 via a line 314 as discussed below. Pin 4 of converter 300 is connected via a capacitor 316 to electrical ground.

Control pins 1, 2, 16 and 3 of converter 300 are connected to pins 15, 12, 10 and 2 respectively, of a level shifter 320. Microcontroller 200 controls pins 16, 1, 2 and 3 of converter 300 through level shifter 320 by the signals "start," MUX0, MUX1, and MUX2 as shown in FIG. 6. Pins 4 and 6 of level shifter 320 are connected to the gate of transistors 322 and 324, respectively, via lines 326 and 328. Lines 326 and 328 are also connected via resistors 330 and 332 to electrical ground. Pin 2 of level shifter 320 is connected to pin 3 of converter 300 via line 333.

The drain of transistor 322 is connected via a line 336 to a diode 338. Current from the 16 volt power source is supplied via line 304 and an amplifier 340 through diode 338. The output of amplifier 340 is connected to the negative input terminal of amplifier 340 via a line 342. The current flowing through diode 338 is used to charge up a capacitor 344 during periods of time when transistor 322 is conductive. During periods of time when transistor 322 is not conductive, capacitor 344 discharges through a parallel resistor 346 in known fashion. Capacitor 344 is also connected to the drain of transistor 324 via a line 348. During periods of time when transistor 324 is conductive, the voltage on capacitor 344 is supplied through transistor 324 to pin 12 of converter 300 via a line 350.

A plurality of resistors 352 are separately connected to pins 3, 5, 7, 9, 11 and 14 of level shifter 320. Pins 3, 5, 7, 9, 11 and 14 of level shifter 320 are also connected to microcontroller 200 in FIG. 9 via lines 334, 354 and 356 and terminals 962, 964 and 966 respectively. Microcontroller 200 thereby controls the operation of level shifter 320.

FIG. 6 also includes a crystal oscillating circuit 358 for providing a high frequency signal to microcontroller 200 via lines 360 and 362. The high frequency output signal from circuit 358 is also supplied to a NAND gate 364 via a line 366. The other input of NAND gate 364 is supplied by the output of a NAND gate 368. The inputs of NAND gate 368 are connected in common to the output of NAND gate 312.

Figure 9:
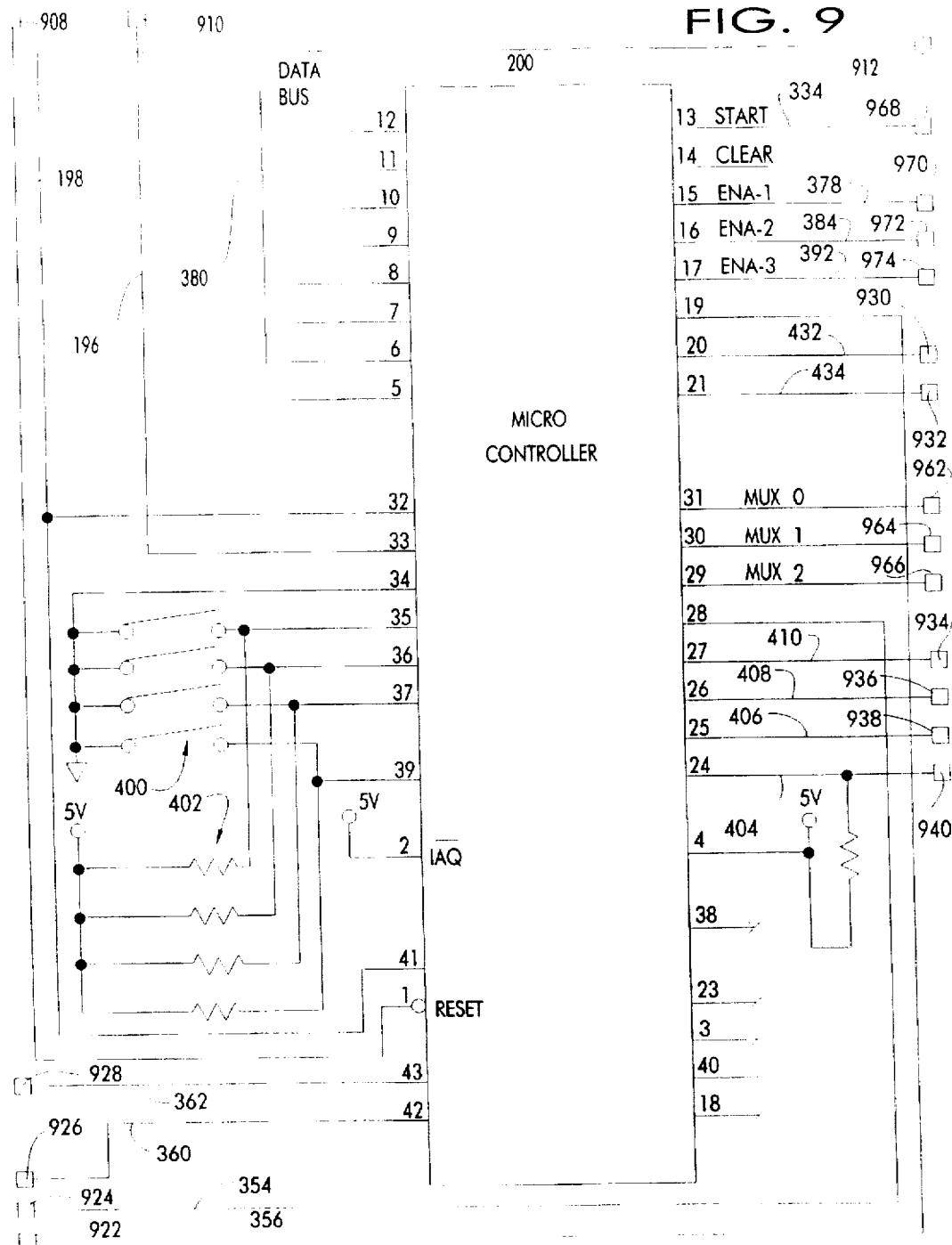

In operation, level shifter 320, under the control of microcontroller 200 in FIG. 9, applies a sequence of signals to the control input pins 1, 2, 3 and 16 of converter 300. This sequence of input signals determines whether the voltage appearing at pin 12, 13 or 15 of converter 300 will be converted for setting the duration of the output signal at pin 7 of converter 300. The output signal of converter 300 is then supplied via line 314 to one of the inputs to NAND gate 312. During periods of time when a voltage is to be measured, microcontroller 200 applies a logic level 1 signal to a line 320 which is connected to the other input of NAND gate 312 and is labeled "start" in FIG. 6. The output of NAND gate 312 is then supplied to the inputs of NAND gate 368. The output of NAND gate 368 is connected to one of the inputs of NAND gate 364. The other input is connected to crystal oscillating circuit 358 via line 366. Accordingly, the output of NAND gate 364 is a high frequency signal, the duration of which is determined by the output signal appearing at pin 7 of converter 300. The high frequency burst of pulses emitted by NAND gate 364 is carried by a line 372.

Figure 7:
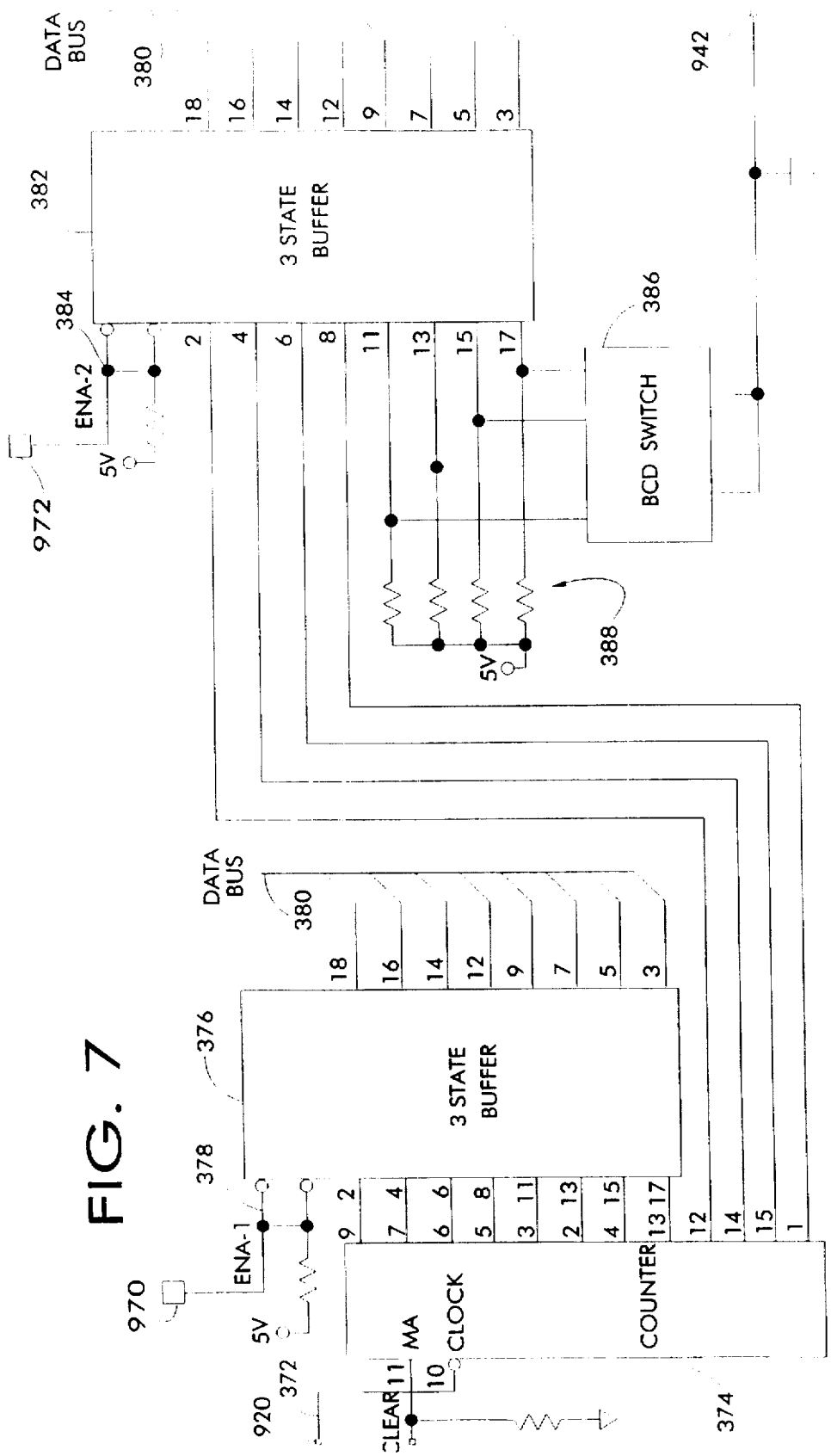

FIG. 7 shows a counter 374 which receives the high frequency burst of pulses via line 372 at the clock input of counter 374. Counter 374 counts each of the pulses in the burst of high frequency pulses on line 372 and supplies an output count value via pins 1, 15, 14, 12, 13, 4, 2, 3, 5, 6, 7 and 9. A three-state buffer 376, when enabled via an enable signal on a line 378 from microcontroller 200, supplies the count output from pins 13, 4, 2, 3, 5, 6, 7 and 9 of counter 374 to a databus 380. A three-state buffer 382, when enabled via an enable signal from microcontroller 200 carried on a line 384, connects the output count value appearing on pins 1, 15, 14 and 12 of counter 374 to databus 380. The other four input pins of three-state buffer 382 are connected to a BCD switch 386. BCD switch 386 and resistors 388 are used to set the constants in the equations for determining the shape of the curve to be implemented by the relay in integrating any overcurrent conditions.

Figure 8:
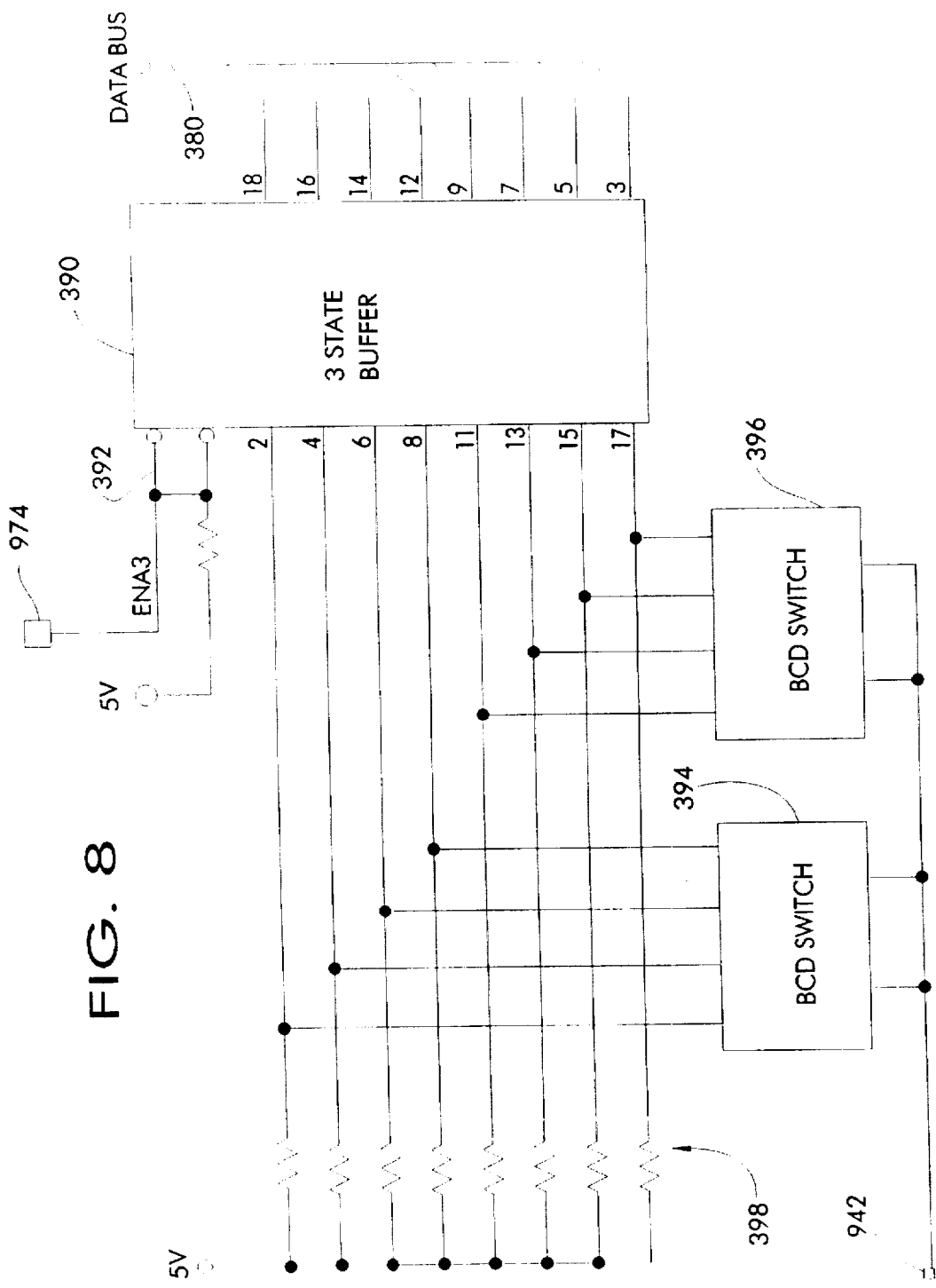

FIG. 8 shows a three-state buffer 390 which, when enabled via an enable signal from microcontroller 200 on a line 392, outputs data indicating the positions of a BCD switch 394 and 396 onto databus 380. A plurality of resistors 398 are connected to a 5 volt power supply for indicating the switch positions of the BCD switches 394 and 396, as understood by those skilled in the art.

FIG. 9 shows microcontroller 200. Pins 5–12 of microcontroller 200 are connected to databus 380. Microcontroller 200 obtains data from databus 380 providing the timed current signal value appearing at pin 15 of converter 300, the instantaneous current signal value appearing at pin 13 of converter 300, the voltage on capacitor 344 appearing at pin 12 of converter 300, the positions of BCD switches 386, 394 and 396. Again, microcontroller 200 is programmed to select the particular data to be read from databus 380 through control of enable lines 378, 384 and 392.

FIG. 9 also shows a plurality of switches 400 which allow the user in the field to select various options, such as instantaneous reset or integrating reset. The particular options selected via switch 400 are determined based on the needs and desires of the user and the programming of microcontroller 200. A plurality of resistors 402 and a 5 volt power source are connected to indicate the positions of switches 400 to microcontroller 200. As previously described, microcontroller 200 receives an oscillating signal, preferably having a frequency of 4 MHz, on pins 42 and 43 for setting the frequency of operation of microcontroller 200. As previously explained, microcontroller 200 outputs a signal on pins 19 and 28 via lines 356 and 354 for controlling level shifter 320 in FIG. 6 to control converter 300 to select the proper data.

Microcontroller 200 also supplies output signals via pins 24-27 and lines 404-410, respectively, to control a circuit breaker for protecting the transmission line.

Figure 10:
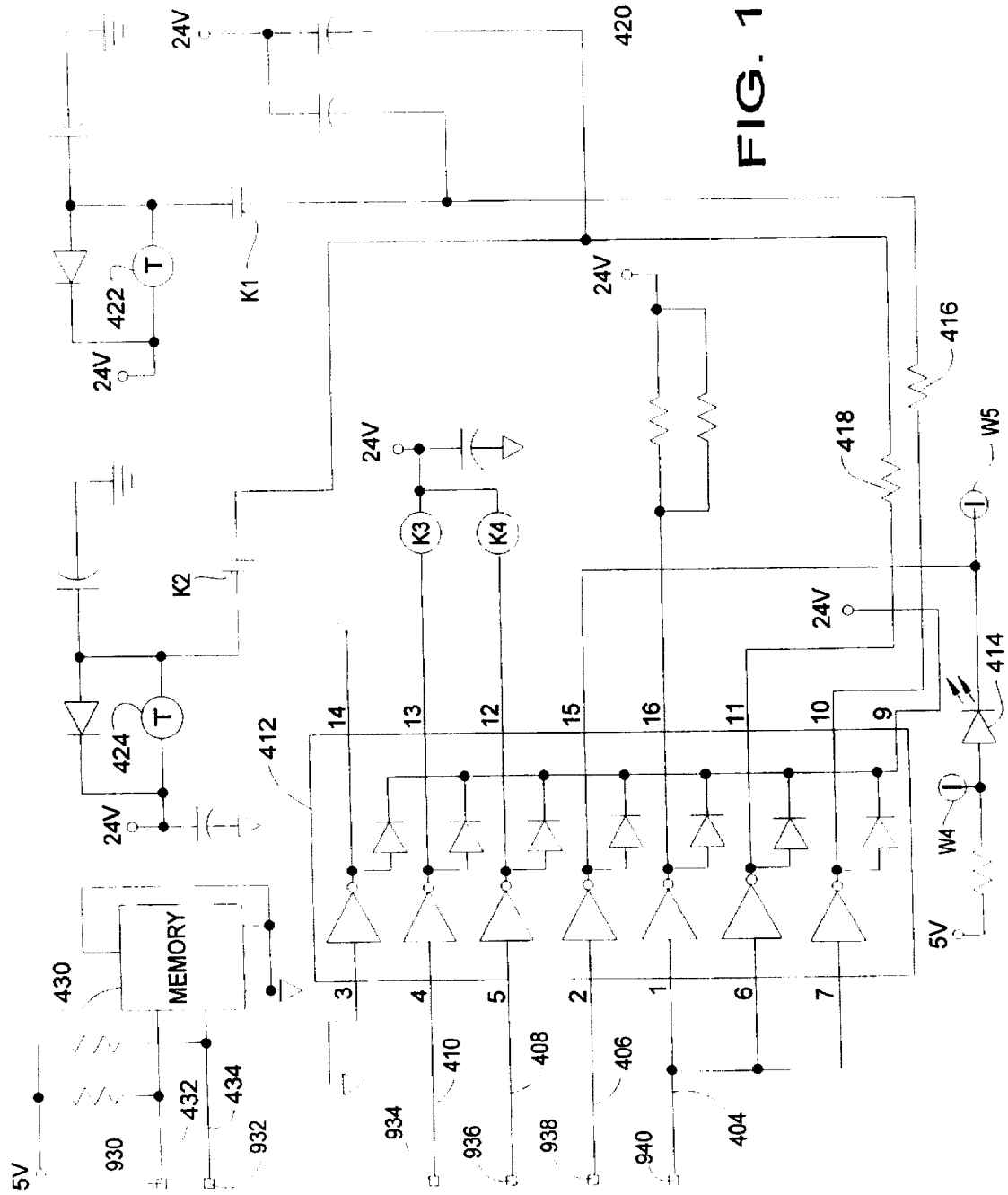

FIG. 10 shows a buffer 412 for buffering the output signals of microcontroller 200 which appear on lines 404-410. The output of buffer 412 at pin 12 controls contact K4 for instantaneously tripping the relay when the current in the transmission line instantaneously exceeds a peak threshold value. The output signal of the buffer 412 at pin 13 controls the contacts for the timed trip relay K3 for switching off the electrical power in the transmission line when the current in the transmission line exceeds the pickup current integrated over a period of time. Accordingly, contacts K4 and K3 are connected in known fashion for controlling a circuit breaker to protect the transmission lines. Output pin 15 on buffer 412 turns on a light-emitting diode 414 during periods of time when the current level in the transmission line to be protected exceeds the pickup level. Light-emitting diode 414 is preferably mounted on the front panel of the relay so that the user can watch LED 414 to determine those periods of time when the current in the transmission line exceeds the pickup current level. Pins 10 and 11 of buffer 412 are connected via resistors 416 and 418, respectively, to the remaining conventional circuitry 420 shown in FIG. 10. For example, conventional circuit 420 includes a target 422 connected in known fashion to indicate when an instantaneous trip has occurred. Similarly, target 424 is connected to indicate when a timed trip of the relay has occurred. Targets 422 and 424 are conventional electromechanical displays which mechanically latch showing a colored disk when a trip condition occurs. The related circuitry connected to targets 422 and 424 is of conventional construction.

FIG. 10 also shows a nonvolatile memory 430. Nonvolatile memory 430 is connected to pins 20 and 21 of microcontroller 200 in FIG. 9 via lines 432 and 434, respectively. During periods of time immediately before microcontroller 200 senses that the current level in the transmission line is dropping below the minimum value needed to operate the circuitry of FIGS. 3-11, microcontroller quickly measures and stores the voltage level on capacitor 344. Microcontroller 200 also stores the time/current level count in nonvolatile memory 430 at this time. When power is later restored, microcontroller 200 measures the new voltage on capacitor 344. Microcontroller 200 then takes the natural log of the ratio of the voltage stored in nonvolatile memory 430 over the voltage of capacitor 344 upon the resumption of power to calculate a natural log reference value. Microcontroller 200 then accesses a table in memory as a function of the natural log reference value to retrieve a time value from the table indicative of the period of time that the electrical current in the transmission line was below the minimum value needed to operate the circuitry. Microcontroller 200 is programmed to adjust the time/current level count stored in nonvolatile memory 430 as a function of the amount of time the power was low as indicated by the time value retrieved from the table. One algorithm for making this adjustment is described above for the circuitry of FIGS. 1 and 2.

It has also been found preferable to store in nonvolatile memory 430 all of the switches which are monitored by microcontroller 200. For example, the positions of BCD switches 386, 394 and 396 are preferably stored in nonvolatile memory prior to a loss of power. When power resumes, microcontroller 200 is preferably programmed to determine whether any of the switches have changed state. If so, it indicates that service personnel have worked with the relay so that microcontroller 200 should reset to an initial condition.

Figure 11:
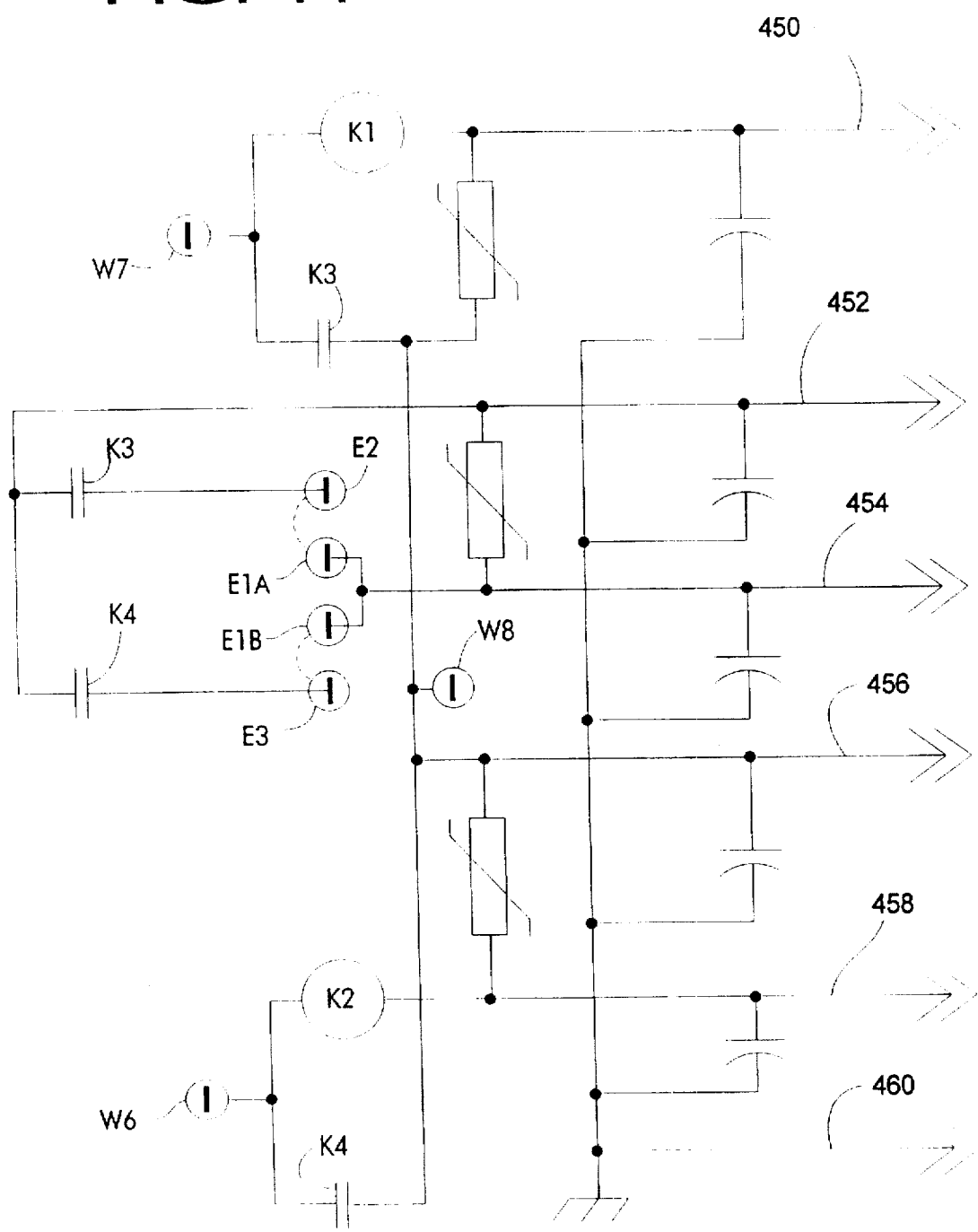

FIG. 11 shows additional circuitry which may be used to provide additional features. W7 can be shorted to W8 by the user to simulate the closing of contacts K3. Similarly, W6 can be shorted to W8 to simulate the closing of contacts K4. Such temporary shorting may be performed to check the relay connections to external equipment. E2 to E1A and E1B to E3 are internal jumpers to allow for auxiliary output contacts.

FIG. 11 also shows a line 450 which carries an output signal indicating that a timed trip should occur. A circuit breaker is connected to line 450 for removing electrical current from the transmission line when a timed trip occurs. Lines 452 and 454 in FIG. 11 are provided as auxiliary lines. An alarm (not shown) may be connected between lines 452 and 454 for sounding an audible alarm when a trip occurs. Line 456 in FIG. 11 provides a common ground and line 460 provides a chassis ground. Line 458 in FIG. 11 provides an output signal indicating when an instantaneous trip occurs. A circuit breaker is preferably connected to line 458 for removing the electrical power from the transmission line when an instantaneous trip occurs.

It will be recognized by those skilled in the art that the present invention may be used with any electronic relay to provide an integrating reset response, not just electronic relays which simulate induction disc based relays. For example, if an electronic relay uses the function f(t) to increase a time/current level count to protect against overcurrents, then the inverse of f(t) may be used (by, e.g. microprocessor 28 in FIG. 1) to decrease the time/current level count where the variable t is determined by a timer (such as timer 44 in FIG. 1) which measures the duration of a power loss. Other functions and other relays may also be used within the scope of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A relay for monitoring an electrical system to protect the electrical system from an overcurrent condition as a time dependent function of an electrical current level in the electrical system, the relay comprising:

a microprocessor for varying a current level count; and a timer for measuring a period of time that includes a period when the electrical current level is less than a minimum current level required for proper operation of the relay;

wherein the microprocessor is responsive to the timer for varying the current level count as a function of at least the measured period of time.

2. The relay of claim 1 further comprising a nonvolatile memory for storing at least the current level count.

3. The relay of claim 1 wherein the timer comprises a resistor and a capacitor; wherein the timer comprises a power supply for charging the capacitor; and wherein the capacitor is at least partially discharged through the resistor during the measured period of time.

4. The relay of claim 3 wherein the microprocessor is configured for measuring the voltage level of the capacitor.

5. The relay of claim 4 wherein the microprocessor is further configured for converting the voltage level of the capacitor at the beginning of the measured period of time and the voltage level of the capacitor at the end of the measured period of time into data indicative of an amount by which the current level count should be varied.

6. A relay for monitoring an electrical system to protect the electrical system from an overcurrent condition as a time dependent function of whether an electrical current level in the electrical system exceeds a pickup current level, the relay being energized by the electrical system during periods of time when the electrical current level exceeds a minimum current level needed for operation of the relay, the relay comprising:

a memory for storing a current level count;

a circuit for varying the current level count over time as a function of at least whether the electrical current level is greater than or less than the pickup current level; and a timer for measuring a duration of an elapsed period of time beginning about when the electrical current level falls below the minimum current level and ending about when the electrical current level rises above the minimum current level;

wherein the circuit adjusts the current level count at the end of the elapsed period as a function of at least the measured duration of the elapsed period.

7. The relay of claim 6 wherein the circuit is configured for varying the current level count over time as a function of a programmed time/current characteristic response and whether the electrical current level is greater than or less than the pickup current level and wherein the circuit adjusts the current level count at the end of the elapsed period as a function of the programmed time/current characteristic response and the measured duration of the elapsed period.

8. The relay of claim 6 wherein the timer comprises a resistor and a capacitor; wherein the timer comprises a power supply for charging the capacitor; and wherein the capacitor is at least partially discharged through the resistor during the elapsed period of time.

9. The relay of claim 8 wherein the timer comprises a MOSFET transistor for intermittently connecting the power supply to the capacitor.

10. The relay of claim 8 wherein the circuit is configured for measuring the voltage level of the capacitor.

11. The relay of claim 10:

wherein the circuit comprises a microprocessor configured for calculating a ratio of the voltage level of the capacitor at the end of the elapsed period of time to the voltage level of the capacitor at the beginning of the elapsed period of time;

wherein the memory further stores a table of values relating voltage ratios to periods of time; and wherein the microprocessor varies the current level count in the memory as a function of at least the period of time in the table of values which is related to the calculated ratio.

12. A method of monitoring an electrical system to protect the electrical system from an overcurrent condition as a time dependent function of an electrical current level in the electrical system, the method comprising the steps of:

detecting the electrical current level in the electrical system over time;

varying a current level count as a function of at least the electrical current level over time;

measuring a period of time that includes a period during which the electrical current level is less than a minimum current level required for proper operation of an electronic relay; and varying the current level count as a function of at least the measured period of time.

13. The method of claim 12 wherein the measuring step comprises the steps of:

providing a resistor and a capacitor;

electrically isolating the resistor and the capacitor from other circuitry when the electrical current level is below the minimum current level; and at least partially discharging the capacitor through the resistor during the measured period of time.

14. The method of claim 13 wherein the measuring step comprises the steps of:

measuring the voltage level of the capacitor at the beginning of the measured period of time and at the end of the measured period of time;

calculating a ratio of the voltage level of the capacitor at the end of the measured period of time to the voltage level of the capacitor at the beginning of the measured period of time; and converting the calculated ratio into data indicative of an amount by which the current level count should be varied.

15. The method of claim 13 wherein the measuring step comprises the steps of:

measuring the voltage level of the capacitor at the beginning of the measured period of time; and storing the current level count and the measured voltage level in memory.

16. An electronic relay for monitoring an electrical current flowing in an electrical line, the relay being powered by the electrical current and configured to provide an integrating reset response for a period of time including when the electrical current is less than a minimum current required for proper operation of the relay.

17. The electronic relay of claim 16 wherein the relay is programmed to substantially mimic the reset function of an induction disk relay.

18. The electronic relay of claim 16 wherein the relay is programmed to monitor the current level over time according to a particular time/current characteristic response.

19. The electronic relay of claim 16 wherein the relay includes a timing circuit.

20. The electronic relay of claim 19 wherein the timing circuit includes a resistor and capacitor network.

21. The electronic relay of claim 20 wherein the relay is configured for electrically isolating the network when the current level is less than the minimum current level.

22. The electronic relay of claim 20 wherein the relay includes a microprocessor configured for detecting a voltage across the capacitor approximately when the current level falls below the minimum current level and for storing the detected capacitor voltage and the current level count in memory.

23. The electronic relay of claim 22 wherein the memory is nonvolatile memory external to the microprocessor.

24. The electronic relay of claim 22 wherein the microprocessor is further configured for detecting a voltage across the capacitor approximately when the current level rises above the minimum current level.

25. The electronic relay of claim 24 wherein the microprocessor is configured for converting the detected capacitor voltages into data indicative of the amount by which a current level count should be adjusted.

26. A relay for monitoring an electrical system to protect the electrical system from an overcurrent condition as a time dependent function of an electrical current level in the electrical system, the relay comprising:

a microprocessor for varying a current level count; and a timer for measuring a duration of a period of time during which the electrical current level is less than a particular current level, wherein the microprocessor is responsive to the timer for varying the current level count as a function of at least the measured duration.

* * * * *